United States Patent [19]

Asaka et al.

[11] Patent Number: 4,466,409
[45] Date of Patent: Aug. 21, 1984

[54] SECONDARY AIR INTRODUCING APPARATUS FOR INTERNAL COMBUSTION ENGINE

[75] Inventors: Urataro Asaka, Kamifukuoka; Teruyuki Nakano; Shinkichi Miyazawa, both of Tokyo; Shoji Masuda, Asaka, all of Japan

[73] Assignee: Honda Giken Kogyo Kabushiki Kaisha, Tokyo, Japan

[21] Appl. No.: 396,270

[22] Filed: Jul. 8, 1982

[30] Foreign Application Priority Data

| Jul. 11, 1981 | [JP] | Japan | 56-107595 |
| Oct. 28, 1981 | [JP] | Japan | 56-171317 |
| Nov. 5, 1981 | [JP] | Japan | 56-176382 |
| Nov. 5, 1981 | [JP] | Japan | 56-176383 |

[51] Int. Cl.³ .................................. F02B 15/00
[52] U.S. Cl. .................................. 123/433; 123/432; 123/90.27; 123/308; 123/306
[58] Field of Search ............... 123/432, 433, 585, 586, 123/587, 588, 90.27, 90.31, 308, 306

[56] References Cited

U.S. PATENT DOCUMENTS

| 1,562,539 | 11/1925 | Cole | 123/433 |
| 3,092,089 | 6/1963 | Dolza | 123/433 |
| 4,149,493 | 4/1979 | Franke | 123/432 |

FOREIGN PATENT DOCUMENTS

| 2746022 | 4/1979 | Fed. Rep. of Germany | 123/433 |
| 46-16166 | 6/1971 | Japan . | |

Primary Examiner—Craig R. Feinberg
Assistant Examiner—David A. Okonsky
Attorney, Agent, or Firm—Armstrong, Nikaido, Marmelstein & Kubovcik

[57] ABSTRACT

A secondary air introducing apparatus for an internal combustion engine comprising a secondary air introducing opening in the sidewall of the cylinder near the position of lower dead point of a piston of the engine. The opening is opened and closed by the piston. A secondary air supply source is interconnected with the opening by an introducing passage. The introducing passage is formed to be an upwardly directed passage extending only upwards from the opening.

8 Claims, 9 Drawing Figures

SECONDARY AIR INTRODUCING APPARATUS FOR INTERNAL COMBUSTION ENGINE

BACKGROUND OF THE INVENTION

This invention relates to a secondary air introducing apparatus chiefly in a four-cycle type internal combustion engine for a vehicle.

It has been known to provide a secondary air introducing opening in a side wall of a cylinder of an internal combustion engine with the opening located near the bottom dead center point of a piston mounted in the cylinder. The opening is generally opened and closed by the piston and is connected through an introducing passage with a secondary air supply source comprising an air pump or the like. It has been usual with this type of apparatus that the introducing passage is so formed that at least a part thereof extends radially sideways or downwardly. Accordingly, this produces a problem that fuel or lubrication oil leaked out from the cylinder into the introducing passage through the introducing opening can be stagnated in the passage or introduced therethrough into the supply source, and thereby instable combustion, damage of the supply source or the like is liable to be caused.

OBJECTS AND SUMMARY OF THE INVENTION

The present invention has as an object to provide a secondary air introducing apparatus for an internal combustion engine which is not subject to blockages or difficulties resulting from liquid fuel or lubricating oil being stagnated or introduced therefrom.

It is a further object of the present invention to provide such an apparatus that swirls the secondary air in the same direction and manner as the intake mixture is swirled.

These and other objects are obtained in a secondary air introducing apparatus for an internal combustion engine wherein the engine includes a cylinder having a sidewall, a piston slideably mounted in the cylinder moveable between a top dead point and a lower dead point, and a cylinder head mounted atop the cylinder. The apparatus comprises a secondary air introducing opening in the sidewall of the cylinder near the position of the lower dead point of the piston. The opening is opened and closed by the piston movement. A secondary air supply source is connected to the introducing opening by an introducing passage. The secondary air introducing passage is formed to be an upwardly directed passage extending only upwards from the opening.

The secondary air supply source can comprise an air pump fixedly provided on the cylinder head, the introducing passage can be so made into sidewalls of the cylinder and the cylinder head as to be formed integrally therewith. Where the engine further includes a cam chain chamber on one side of the cylinder and cylinder head, the introducing passage is so made in the sidewalls of the cylinder and cylinder head as to be located on the opposite side of the engine in relation to the chain chamber. The apparatus can further comprise a check valve interposed in the introducing passage and an end portion on the downstream side of the introducing passage which includes a chamber extending substantially tangentially on the outside of the introducing opening. The chamber is brought into communication through the opening made in one lateral sidewall thereof with the introducing opening. The chamber may be so formed that the cross-sectional area thereof gradually decreases toward the forward end thereof.

In the structure, when the engine further includes at least one intake opening on one side and one exhaust opening on the other side of the cylinder, located above the top dead point of the piston and arranged to be opened and closed by respective intake and exhaust valves, the intake and exhaust openings can be disposed to be biased in the mutually opposite directions from a center crossing line so that the mixture to be introduced through the intake opening into the cylinder may be whirled in one direction in the cylinder. In this structure, the introducing opening is so open as to direct towards one side of the cylinder tangentially so that the secondary air to be introduced through the opening into the cylinder may be whirled in the same direction as the mixture.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
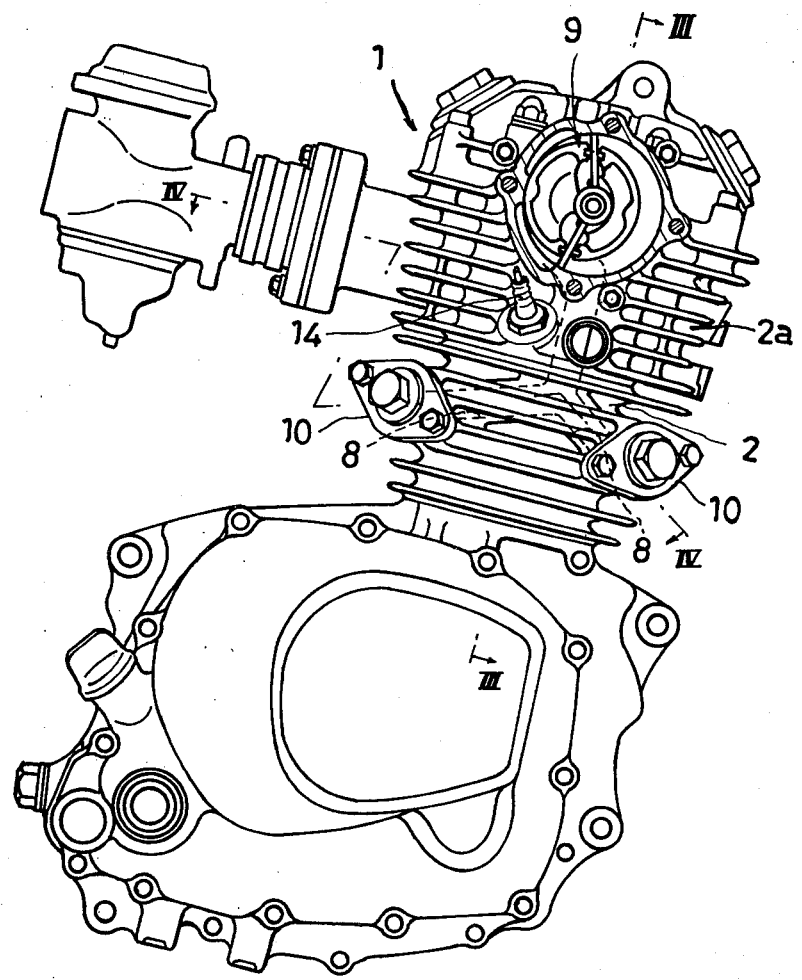
FIG. 1 is a side view of an internal combustion engine having one embodiment of the present invention.
Figure 2:
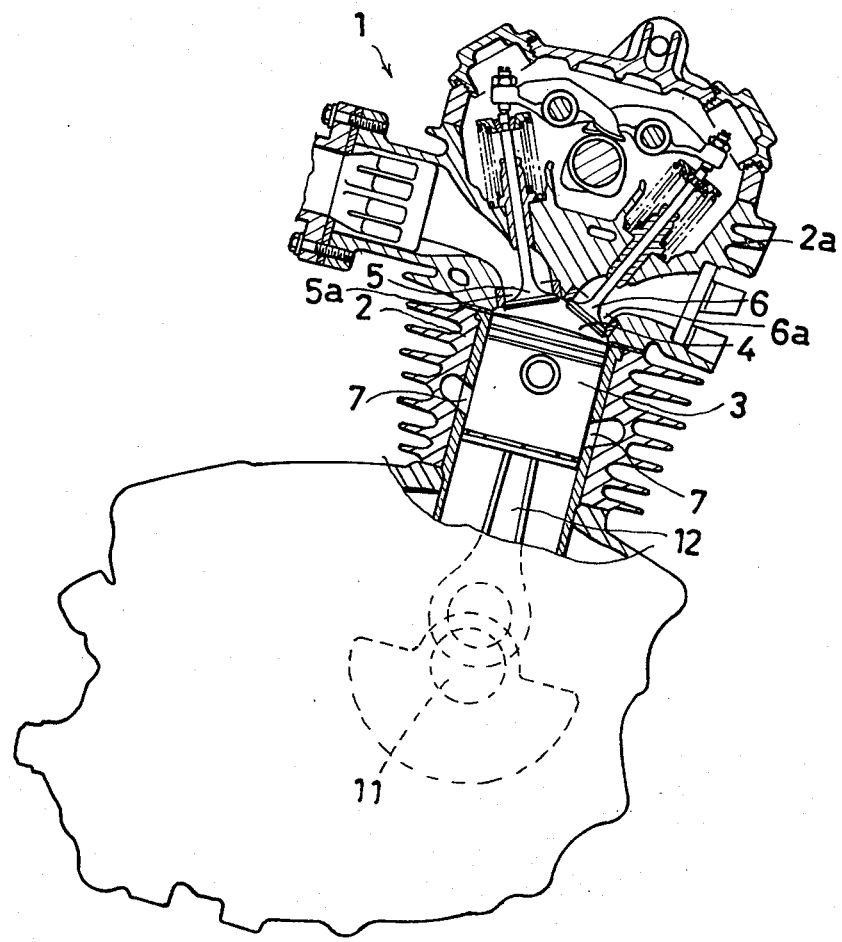
FIG. 2 is a side view, partly in section, of the engine having the first embodiment.

Referring to the drawings, an internal combustion engine 1 having a cylinder 2 is shown with a piston 3 mounted therein. The cylinder 2 is provided with at least one intake opening 5a on one side and one exhaust opening 6a on the other side so that the pair of those openings 5a, 6a are located above the top dead point of the piston 3. That is, the openings are at a place at which they may be open to the interior of the combustion chamber 4, and are arranged to be opened and closed by respective intake and exhaust valves 5, 6. Additionally, the cylinder 2 is provided with at least one secondary air introducing opening 7 so that the opening 7 may be located near and above the bottom dead point of the piston 3 and may be arranged to be opened and closed by the piston 3.

Figure 4:
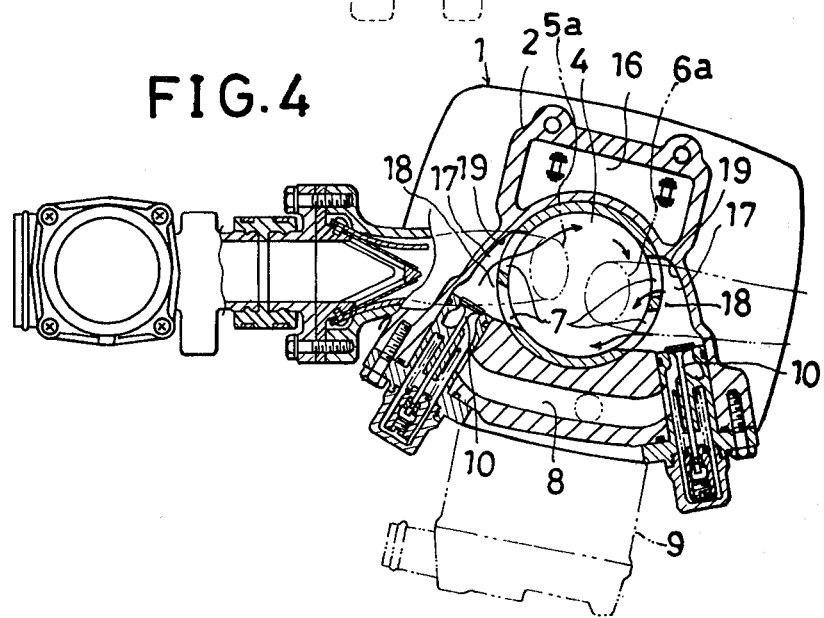
FIG. 4 is a sectional view taken along lines IV—IV of FIG. 1.

In the illustrated example, as shown clearly in FIG. 4, as for the introducing opening 7, there are provided a pair of the openings 7 which face one another, and are connected through respective introducing passages 8, 8 to a secondary air supply source 9 comprising an air pump arranged to be driven by the engine 1. A check valve 10 is interposed in each of the introducing passages 8, 8. The crankshaft 11 is connected to the piston 3 through a connecting rod 12. A cam shaft 13 is provided for opening and closing control of the intake and exhaust valves 5, 6 and is positioned in a cylinder head 2a attached to the top portion of the cylinder 2. An ignition plug 14 is provided.

Figure 3:
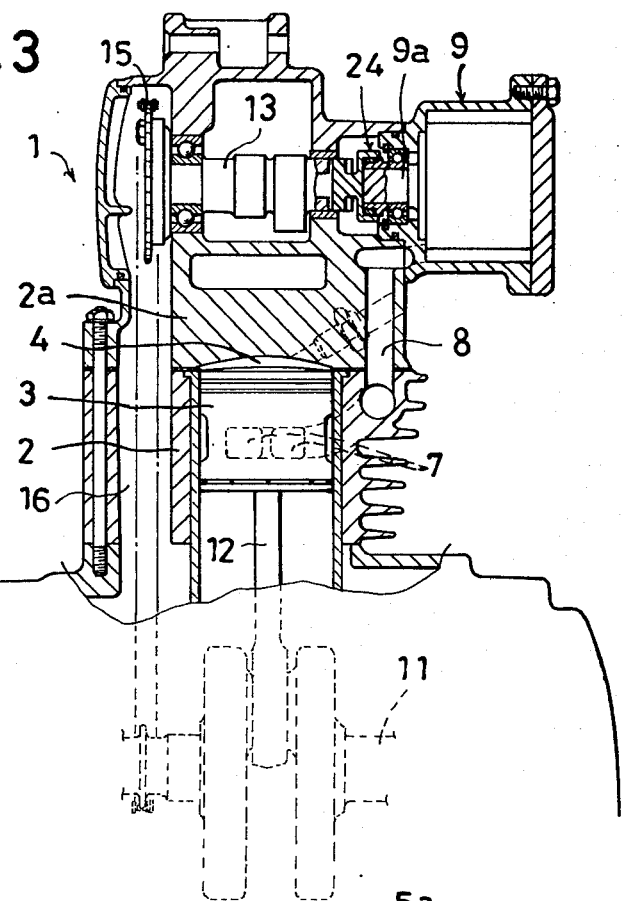
FIG. 3 is a sectional view taken along lines III—III of FIG. 1.

The above construction is not especially different from that in the conventional apparatus. According to this invention, each of the introducing passages 8, 8 is so formed or designed as to be an upwardly directing passage extending upwards from each of the introducing openings 7, 7. Namely, each passage 8 is formed such that the same, instead of extending sideways or downwardly, extends upwards at every portion thereof, so that fuel or lubrication oil leaked out into the passage 8 through the opening 7 is neither stagnated in the passage 8 nor introduced into the supply source 9 region. In this case, the supply source 9 is provided to be located above the passage 8. In the illustrated example, it comprises, as shown clearly in FIG. 3, the air pump fixed to the cylinder head 2a and is arranged to be driven by the cam shaft 13. Furthermore, the passage 8 is such that the same is so formed in the side walls of the cylinder 2 and the cylinder head 2a as to be formed integrally with those walls as by being defined by the two walls themselves. Thus, the air to be introduced through the passage 8 into the cylinder may be preheated by the high temperature of the cylinder 2 and the cylinder head 2a for facilitating forming of a mixture and improving the ignition thereof. At the same time, in turn, the cylinder 2 and the cylinder head 2a may be cooled by the introducing air. Furthermore, in this case, the cylinder 2 and the cylinder head 2a are provided, on the opposite side of the location of the supply source 9, with a cam chain chamber 16 for receiving a cam chain 15 for driving the cam shaft 13. In other words, the passage 8 is provided to be located at the opposite side of the location side of the cam chain chamber 16. Furthermore, in the illustrated example, as shown clearly in FIG. 4, the passage 8 is formed, at its end portion located on the downstream side of the valve 10 into a chamber 17 extending substantially tangentially outside the introducing opening 7. The chamber 17 is in communication with the introducing opening 7 through an opening 18 made in one lateral side wall thereof, so that the combustion gas blown back through the introducing opening 7 toward the check valve 10 may pass through the opening 18 and strike against the other lateral side wall 19 of the chamber 17. In this manner, the combustion gas is prevented from being introduced directly to the check valve 10. The check valve 10 may be of a poppet type as illustrated, a reed valve type (not illustrated), or any other type. Furthermore, the foregoing chamber 17 is so formed as to be gradually decreased in its cross sectional area towards the forward end thereof so that the secondary air in the opening 18 can be kept nearly uniform in pressure at the time of being introduced into the cylinder.

Figure 5:
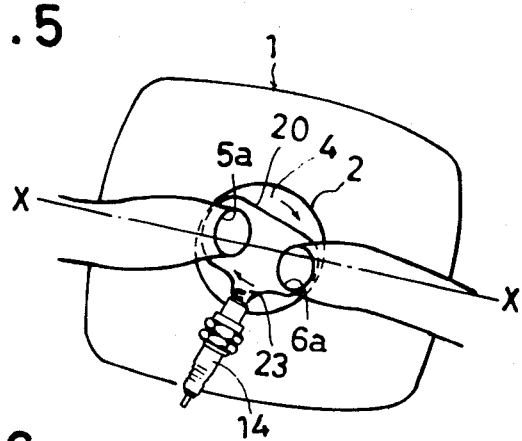
FIG. 5 is a sectional plan diagrammatic view of a cylinder head portion of an internal combustion engine.
Figure 6:
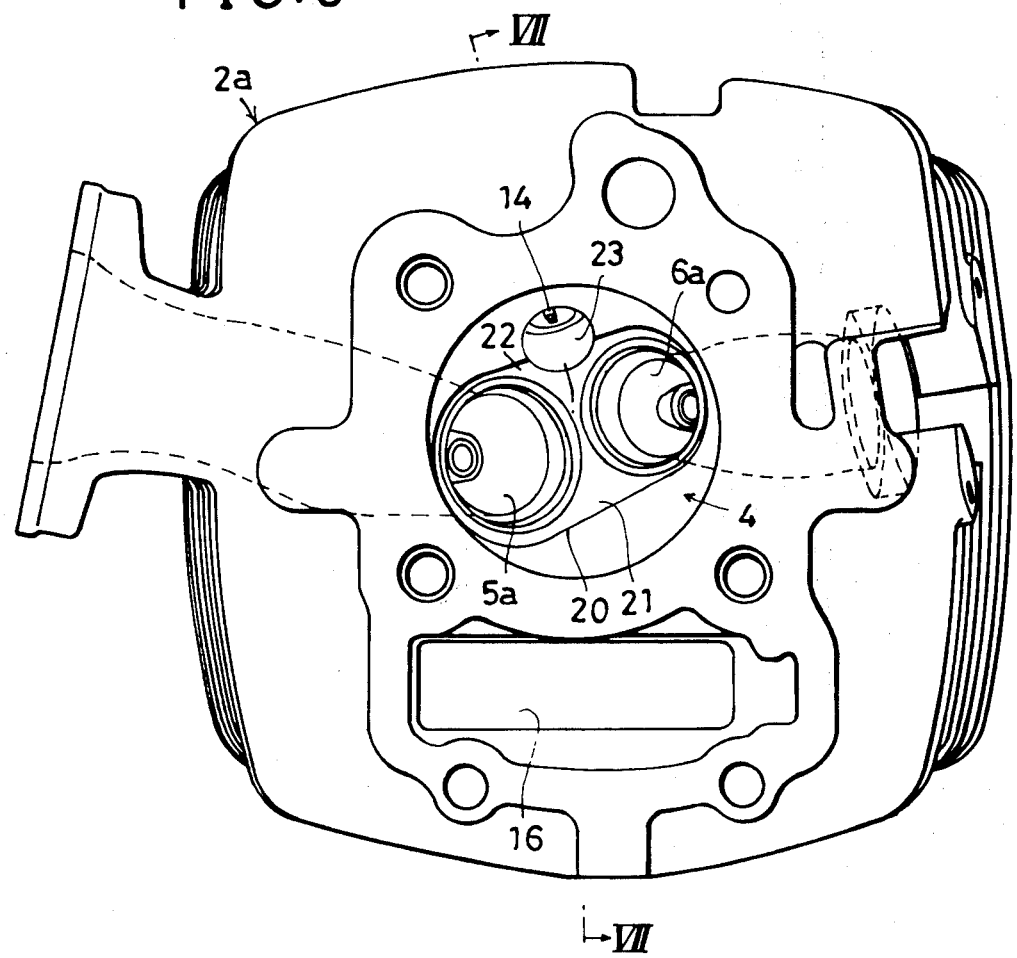
FIG. 6 is a bottom view thereof.
Figure 7:
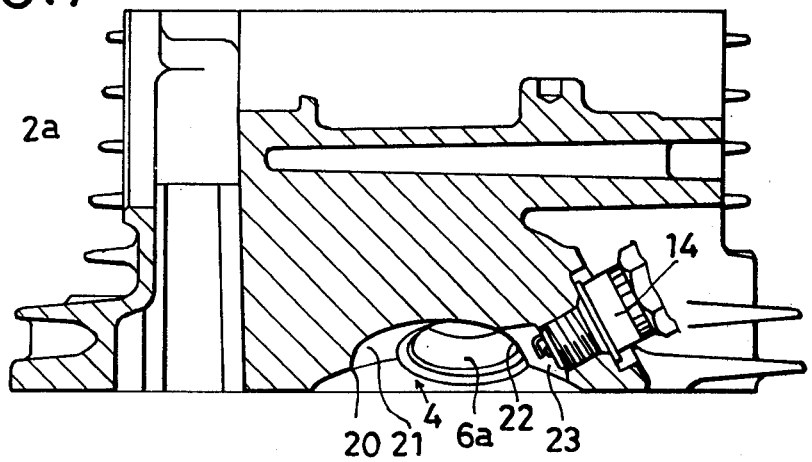
FIG. 7 is a sectional view taken along lines VII—VII in FIG. 6.

Furthermore, as shown clearly in FIG. 5, the intake opening 5a and the exhaust opening 6a are so disposed as to be biased on the mutually opposite side from a center line X—X extending to cross the center of the cylinder, so that the mixture to be introduced through the intake opening 5a into the cylinder may be whirled in one direction in the cylinder 2, for instance, in the clockwise direction as shown. Furthermore, as illustrated clearly in FIG. 4, the introducing opening 7 is so open as to direct toward one side along the tangential direction so that the secondary air to be introduced therethrough into the cylinder 4 may be whirled in the same direction as that of the whirling mixture, that is, in the clockwise direction in the cylinder 2 as shown.

According to this arrangement, the secondary air is introduced in the cylinder 2 in the same direction as the whirl direction of the mixture, so that the introduction thereof into the cylinder becomes smooth and reliable, and the combustion efficiency is improved.

Furthermore, in the illustrated example, the combustion chamber 4 is constructed as described below for further improving the combustion efficiency. Namely, a surrounding stepped on raised portion 20 is so provided on the top portion of the combustion chamber 4 as to project downwards therefrom in the form of an oval and surround the whole of the two openings 5a and 6a, so that there are formed therein on one side a guide surface 21 for guiding the intake mixture from the intake opening 5a region towards the exhaust opening 6a region and on the other side a guide surface 22 for guiding thereafter the same from the exhaust opening 6a region towards the intake opening 5a region. Additionally, the ignition plug 14 is provided in the middle portion of the other side guide surface 22. In this case, there is made in the middle portion a cavity opening in the form of a cone and the ignition plug 14 is provided therein, so that the ignition plug 14 is not exposed directly to the current of the mixture flowing along on the guide surface 22. Consequently, the ignition thereof is improved, and the conical cavity opening may serve effectively to improve propagation of the flame and the exhaust of the gases.

Figure 8:
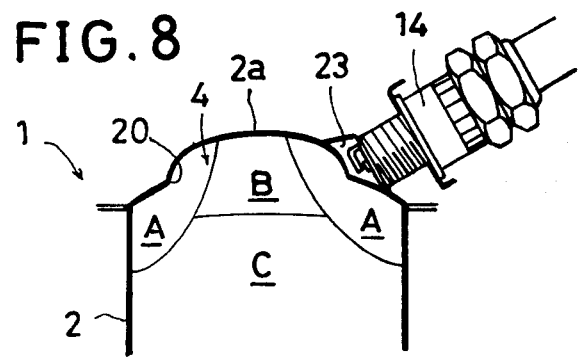
FIG. 8 is a diagram for explaining the distributional condition of a mixture.

With this arrangement, the intake mixture introduced through the intake opening 5a is first guided by the one side guide surface 21 and then by the other side guide surface 22 in the interior space surrounded by the stepped portion 20. The shaping results in generation of a swirl of the intake mixture and during this time, the liquid-form fuel component contained in the mixture is forced to be introduced to the peripheral side by centrifugal force so that a comparatively rich mixture is formed on the peripheral side. The mixture is at the same time improved in its quality as a result of the liquid fuel component being evaporated by high temperature during passing through the exhaust opening 6a region. The swirl is then guided towards the lower side thereof through the stepped portion 20, so that a comparatively rich mixture is formed also outside the peripheral side of the stepped portion 20. Next, at the time of the end of the intake stroke, the secondary air is introduced into the cylinder from below through the introducing opening 7. Thereafter, the piston 3 is moved upwards to act thereon towards the push-up side, and the comparatively thick mixture existing at the peripheral side is partly guided upwards toward the center portion. Thus, the resultant mixture condition is as shown in FIG. 8. Namely, a mixture of three layers results comprising a comparatively rich mixture layer A formed on the peripheral portion extending over from the inner peripheral side of the stepped portion 20 to the lower side of the outer periphery thereof, a comparatively lean mixture layer C formed on the lower portion thereof. If the mixture is ignited by the ignition plug 14, a flame is first produced in the cavity 23, and the same spreads in sequence to the peripheral portion layer A, the central top portion layer B and the lower portion layer and consequently there can be obtained three layer combustion and the combustion efficiency is improved.

Additionally, in the illustrated example, in order to dampen, in the case of driving the air pump 9 serving as the supply source 9 by the cam shaft 13, a change in the rotation speed of the cam shaft 13 and a change in the driving force thereof caused by a change in delivery pressure of the air pump 9, a driving shaft 9a of the pump 9 is connected to the cam shaft 13 through a joint 24 as described below.

Figure 9:
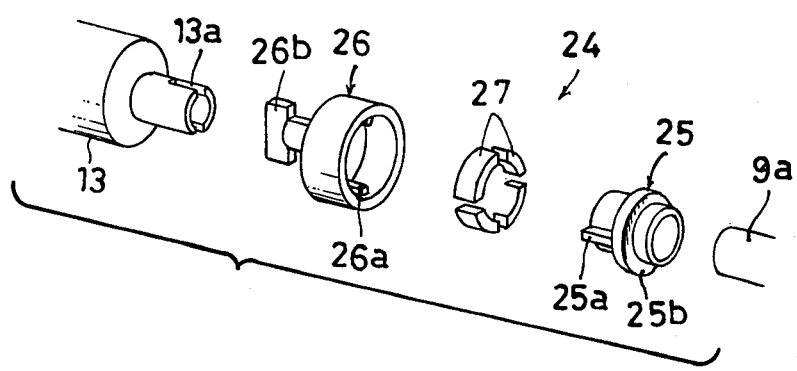
FIG. 9 is an exploded perspective view of a joint used for connecting between a secondary air supply source and a cam shaft.

Namely, as shown clearly in FIG. 9, the joint 24 comprises an inner ring member 25 fixedly mounted to the driving shaft 9a and having a pair of projections 25a on the outer surface of the periphery thereof, an outer ring member 26 mounted on the inner ring member 25 and having a pair of projections 26a on the inner surface of the periphery thereof, and a damper member 27 of resilient material such as rubber or the like interposed in each space between those projections 25a, 26a, and the outer ring member 26 is brought into engagement, at an engaging member 26b extending integrally in the diametrical direction, with a slit 13a made in the end portion of the cam shaft 13.

With this arrangement, the driving force integrally transmitted through the damper member 27 to the inner ring member 25, and accordingly to the driving shaft 9a connected thereto, so that any change in rotation speed of the cam shaft 13 or any change in driving force caused by a change in the pump delivery pressure can be absorbed by the damper member 27 and a smooth and stable rotation of the pump 9 results. Additionally, this arrangement makes the joint 24 small in size. Accordingly, it becomes possible to attach the pump 9, which detests any inflow of oil to the upper portion of the engine 1 such as the cylinder head 2a or the like as mentioned before, resulting in a compact attachment as a whole. The inner ring member 25 is provided on its end portion with a flange 25b to be mounted slidably in the outer ring member 26 so that its inside portion containing the damper member 27 may be closed substantially by the same, and thereby the damper member 27 can be prevented from any damage caused by entering oil or the like and a stable performance thereof can be assured for a long time.

Thus, according to this invention, the introducing passage for communicating between the secondary air introducing opening and the secondary air supply source is formed to become an upwardly directing passage extending upwards from the introducing opening, so that there can be removed the foregoing defect with the conventional type apparatus in which an introducing passage extends sideways or downwardly. It is readily apparent that the above-described secondary air introducing apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A secondary air introducing apparatus for an internal combustion engine, the engine including a cylinder having a side wall, a piston slideably mounted in the cylinder moveable between a top dead point and a lower dead point, and a cylinder head mount atop of the cylinder, said apparatus comprising a secondary air introducing opening in said side wall of said cylinder near the position of the lower dead point of said piston, said opening being opened and closed by said piston, a secondary air supply source, and an introducing passage interconnecting said supply source to said opening, said introducing passage being formed to be an upwardly directed passage extending only upwards from said opening, a passage section adjacent said opening being free of both horizontal portions and portions extending below said opening, the entire introducing passage being formed integrally in the side walls of the cylinder head and cylinder block.

2. An apparatus of claim 1, wherein said secondary air supply source comprises an air pump fixedly provided on said cylinder head.

3. An apparatus of claim 1, wherein the engine is a single cylinder engine which further includes a cam chain chamber, and the introducing passage is so made in the side wall of the cylinder and the cylinder head as to be located on an opposite side of said engine in relation to said cam chain chamber.

4. An apparatus of any of claims 1 to 3 wherein said engine further includes at least one intake opening on one side and one exhaust opening on another side of said cylinder located above the top dead point of the piston and arranged to be opened and closed by respective intake and exhaust valves, said intake and exhaust openings being disposed to be biased in mutually opposite directions from a center crossing line X—X so that a mixture to be introduced through the intake opening into the cylinder is whirled in one horizontal direction in the cylinder, and wherein the introducing opening is so open as to direct toward one side of said cylinder tangentially so that the secondary air to be introduced through the introducing opening into the cylinder is whirled in the cylinder in the same direction as the mixture.

5. An apparatus of any of claims 1 to 3, wherein said apparatus further comprises a check valve interposed in the introducing passage, and an end portion on a downstream side of the introducing passage includes a chamber extending substantially tangentially on an outside of the introducing opening, the chamber being brought into communication through an opening made in one lateral side wall thereof with the introducing opening.

6. An apparatus of claim 5, wherein said engine further includes at least one intake opening on one side and one exhaust opening on another side of said cylinder located above the top dead point of the piston and arranged to be opened and closed by respective intake and exhaust valves, said intake and exhaust openings being disposed to be biased in mutually opposite directions from a center crossing line X—X so that a mixture to be introduced through the intake opening into the cylinder is whirled in one horizontal direction in the cylinder, and wherein the introducing opening is so open as to direct toward one side of said cylinder tangentially so that the secondary air to be introduced through the introducing opening into the cylinder is whirled in the cylinder in the same direction as the mixture.

7. An apparatus of claim 5, wherein the chamber is so formed that a cross-sectional area thereof gradually decreases towards a forward end thereof.

8. An apparatus of claim 7, wherein said engine further includes at least one intake opening on one side and one exhaust opening on another side of said cylinder located above the top dead point of the piston and arranged to be opened and closed by respective intake and exhaust valves, said intake and exhaust openings being disposed to be biased in mutually opposite directions from a center crossing line X—X so that a mixture to be introduced through the intake opening into the cylinder is whirled in one horizontal direction in the cylinder, and wherein the introducing opening is so open as to direct toward one side of said cylinder tangentially so that the secondary air to be introduced through the introducing opening into the cylinder is whirled in the cylinder in the same direction as the mixture.

* * * * *